United States Patent

[11] 3,540,347

| [72] | Inventor | Joseph Gerard Randall<br>Boston, Massachusetts (28 Wrentham St.<br>Dorchester, Mass. 02122) |
|---|---|---|
| [21] | Appl. No. | 752,956 |
| [22] | Filed | Aug. 15, 1968 |
| [45] | Patented | Nov. 17, 1970 |

[54] METHOD AND APPARATUS FOR MACHINING WORKPIECES
8 Claims, 16 Drawing Figs.

[52] U.S. Cl. .................................................. 90/15; 77/58
[51] Int. Cl. .................................................. B23c 1/06; B23b 47/00
[50] Field of Search ............................................ 90/16, 15.2, 15, 11.3; 77/58, 58.3, 58.34; 51/241—0

[56] References Cited
UNITED STATES PATENTS

| 259,727 | 6/1882 | Smith | 90/15-X |
| 1,316,718 | 9/1919 | Hall | 90/15-2-X |
| 2,718,820 | 9/1955 | Faslet | 90/16 |
| 2,875,629 | 3/1959 | Poorman | 51/245-X |
| 3,153,354 | 10/1964 | Prince | 77/58-3 |
| 3,263,570 | 8/1966 | Heffron et al. | 77/58-34-X |

FOREIGN PATENTS

| 857,704 | 3/1940 | France | 90/15 |

*Primary Examiner*—Gil Weidenfeld
*Attorney*—Munroe H. Hamilton

ABSTRACT: A boring attachment for use with a milling machine, includes an input shaft, an output shaft, gear mechanism for driving the output shaft, and a special slide device for adjustably positioning the output shaft. The arrangement of gearing and slide mechanism is such that a hole may be bored at one rotative speed of a cutting tool secured to the output shaft and simultaneously the output shaft and cutting tool may be moved in a circular path of travel at another rate of speed.

Patented Nov. 17, 1970

Inventor:
Joseph G. Randall,
by Munn H. Smith
Attorney

Inventor:
Joseph G. Randall,
Attorney

Patented Nov. 17, 1970
3,540,347
Sheet 3 of 6
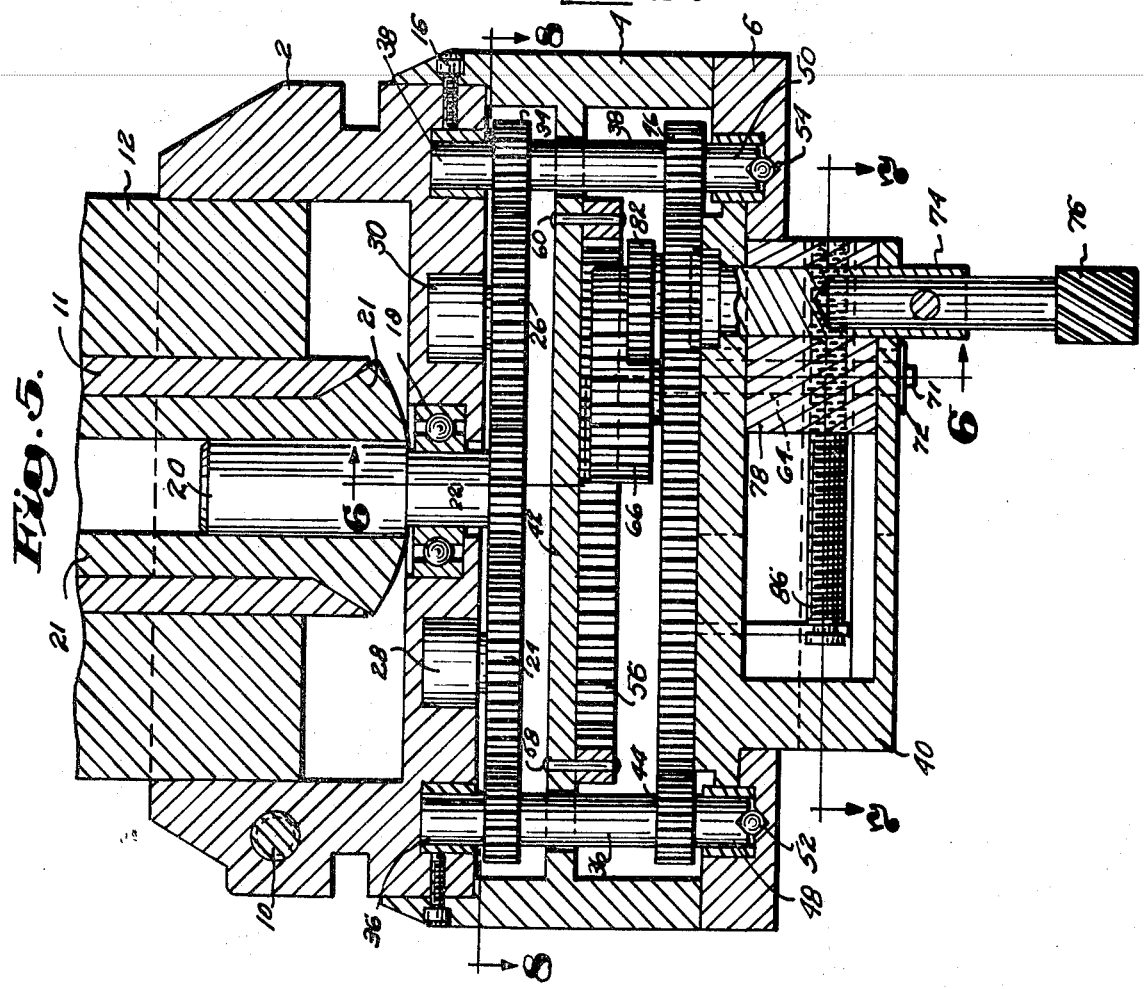
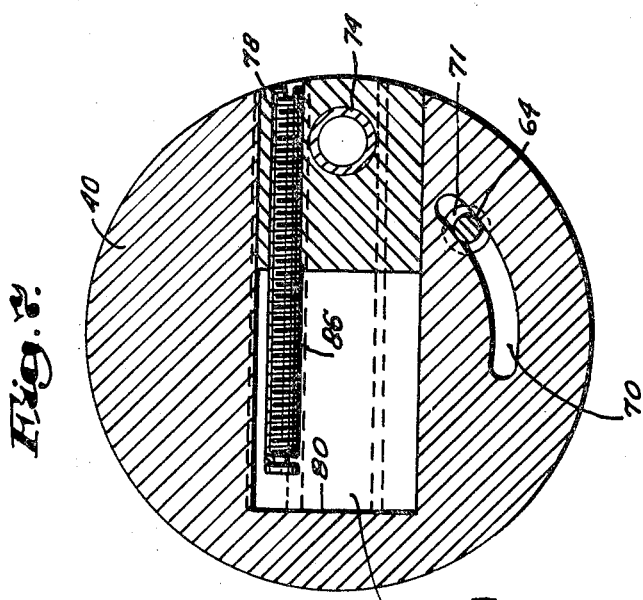
Inventor:
Joseph G. Randall,
by Munro H. Hamilton
Attorney Patented Nov. 17, 1970

Inventor:
Joseph G. Randall,
by Munn & Hamilton Attorney

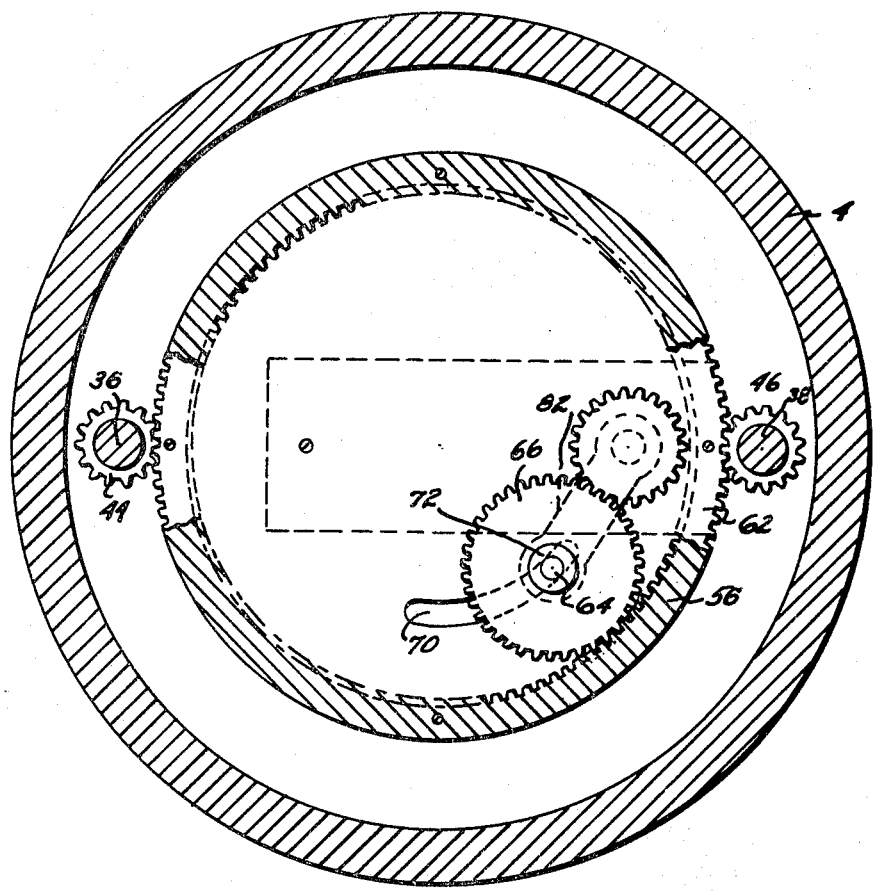

Inventor:
Joseph G. Randall,
by Munn H. Hamilton
Attorney

METHOD AND APPARATUS FOR MACHINING WORKPIECES

This invention relates to machine tools and more particularly to a machine tool for cutting or boring a hole in a workpiece and circumferentially extending the cutting action as desired to increase the size of the hole which is formed.

In conventional machines such as milling machines, it is customary to bore holes and enlarge the holes by utilizing a single-point tool which is moved along an arcuate path of travel. Such a cutting tool is advanced at a relatively low rate of travel and is limited in the amount of material which can be removed.

It is a chief object of the present invention to improve machine tools of the class indicated and to devise a tool for cutting holes in a workpiece and enlarging such holes in an efficient manner.

Another specific object of the invention is to devise a method of cutting in which a workpiece is subjected to two separate cutting actions by means of a cutting tool having novel gear-driving means which provide for adjustably supporting the tool so that it may be revolved about a center while being simultaneously rotated about its own axis at a relatively greater speed.

Still another object of the invention is to provide a cutting tool having novel driving gear mechanism for rotating the tool at a relatively high speed about its axis while revolving about a center throughout a range of hole sizes, and which can also be conveniently attached to conventional milling machines as well as other rotatable power sources.

Still another specific object of the invention is to provide a cutting tool having a novel cutter supporting slide apparatus which can be conveniently adjusted to provide a quick and accurate change in the setting of the tool relative to a fixed boring center.

The nature of the invention and its other objects and novel features will be more fully understood and appreciated from the following description of a preferred embodiment of the invention selected for purposes of illustration and shown in the accompanying drawings in which:

FIG. 5 is a vertical cross-sectional view taken on line 5–5 of FIG. 4;

FIG. 7 is a cross section taken on the line 7–7 of FIG. 5;

FIG. 9 is a cross section taken on the line 9–9 of FIG. 6;

In accordance with the invention, I provide an improved method of forming a workpiece which includes the steps of engaging a cutting tool with the edges of an opening in the workpiece and moving the cutting tool along a circular path at one predetermined speed. Simultaneously the cutting tool is rotated about its own axis at a relatively greater speed.

Figure 1:
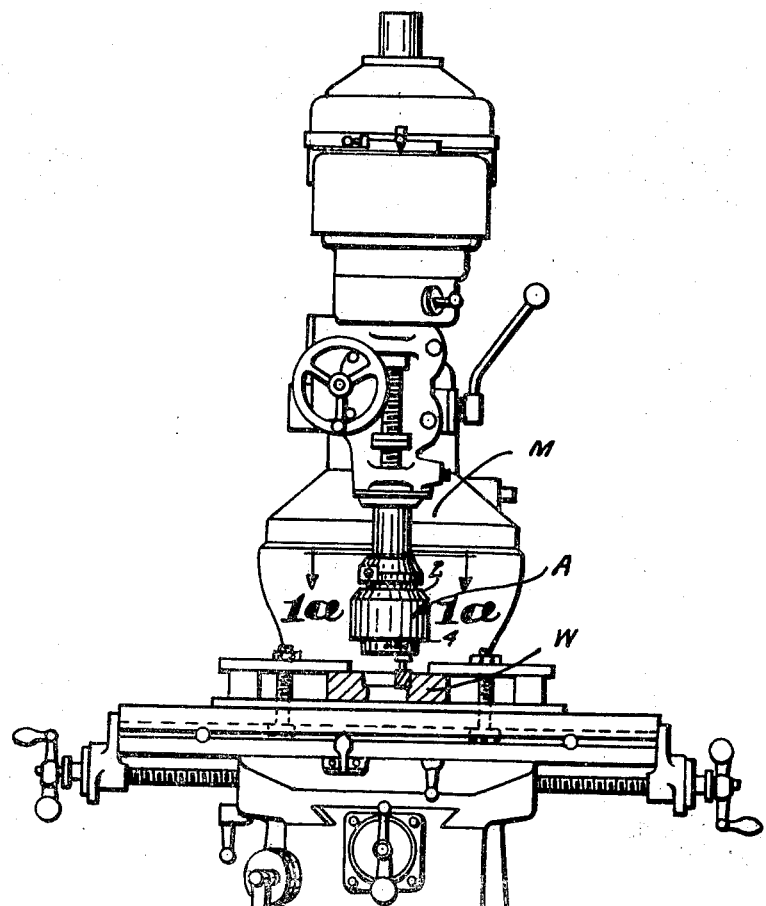
FIG. 1 is an elevational view of a conventional milling machine showing the invention attached to the power drive head of the machine, and also indicating a workpiece being processed by the cutting tool of the invention.

The boring operation may be carried out utilizing a typical milling machine machine M to which is secured a boring attachment indicated by the arrow A as illustrated in FIG. 1. The principal parts of attachment A include an output shaft and cutting tool for boring holes, a housing containing gear mechanism for operating the output shaft, and a novel output shaft support and slide-adjusting apparatus for varying the size of the hole to be bored by the cutting tool attached to the end of the output shaft.

Figure 4:
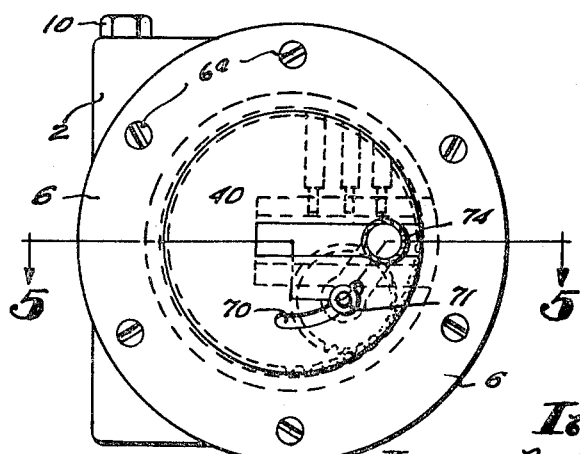
FIG. 4 is a bottom plan view of the structure shown in FIGS. 2 and 3.

Referring more in detail to the structure shown in the drawings, I have indicated in FIG. 1 the milling machine M in an operative position engaged with a workpiece W. In carrying out the method of the invention, I provide for conveniently and quickly securing the attachment A to the machine M. As one suitable means of accomplishing this, I may employ a housing preferably made up in three parts, consisting of an upper housing section 2, a lower housing section 4 and a bottom closure plate 6 adjustably secured to the underside of housing section 4 by means of fastenings 6a, as shown in FIG. 4.

Figure 1A:
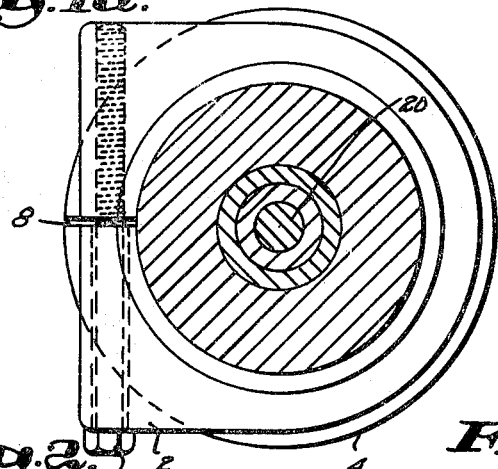
FIG. 1a is a plan cross section taken on the line 1a –1a of FIG. 1.
Figure 2:
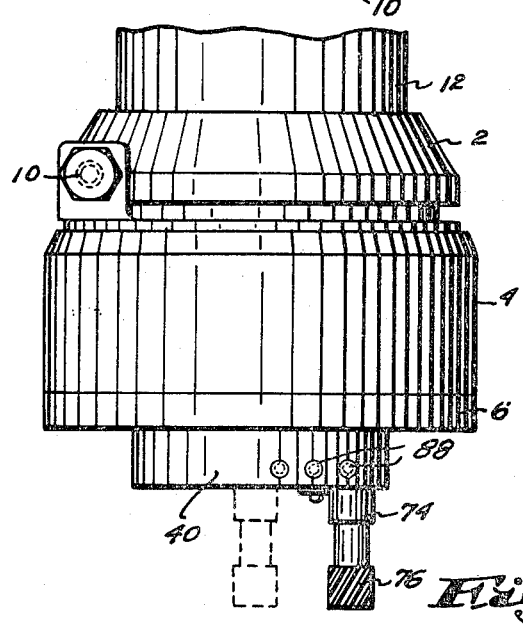
FIG. 2 is a fragmentary elevational view of the cutting tool of the invention together with a rotary table for supporting and actuating the cutting tool.
Figure 3:
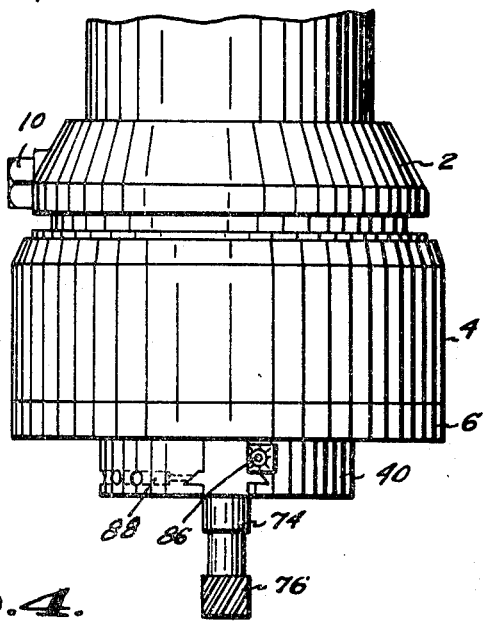
FIG. 3 is another fragmentary elevational view of the structure shown in FIG. 2 but viewed at substantially right angles thereto.

The upper housing section 2 is split at 8 as shown in FIG. 1a and is further provided with an adjustment bolt 10. This arrangement is designed to constitute one suitable means for clamping the invention structure to a rotating power source such as, for example, the hollow spindle 11 of machine M rotatable in quill 12 as indicated in FIG. 5. When the split housing section 2 is fitted on over the part 12 and the adjustment bolt 10 is tightened, the assembly becomes solidly secured together as shown in FIG. 5 and is ready for a boring operation.

Figure 10:
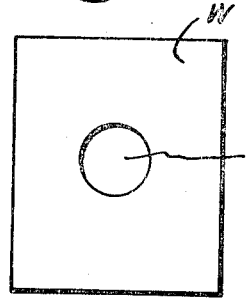
FIG. 10 is a plan view of a workpiece showing a hole bored therethrough in preparation for forming a larger hole.
Figure 11:
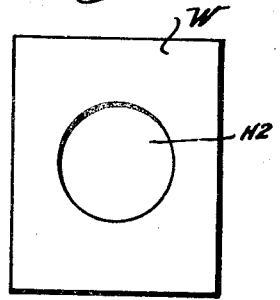
FIG. 11 is another plan view showing the workpiece after having been processed by the boring means of the invention.

Essentially the boring method of the invention includes supporting the workpiece W in the milling machine M as shown in FIG. 1. The workpiece may be of a type already formed with a hole which is to be enlarged, in which case the boring attachment engages with edges of the hole and enlarges it. If no hole is present the boring attachment may be first used to form a hole and then applied to enlarge the hole. FIG. 10 illustrates the workpiece W with a hole H1 and FIG. 11 illustrates the workpiece W with an enlarged hole H2.

Considering the several parts of boring attachment A in greater detail, the lower housing section 4 is recessed to form an inner annular shoulder portion 14 as indicated in FIG. 5 and this provides an annular part on which is received the bottom of housing section 2. These parts may also be adjustably secured together by fastening members as 16.

Centrally supported in bearing 19 in the upper housing section 2 is an input shaft 20 which is adapted to be secured within the hollow spindle 11 of machine M by means of an adjustment collet 21. This input drive shaft mechanism includes a gear 22 fixed at the lower end of the shaft. Gear 22 meshes with and drives two other gears 24 and 26 mounted on idler shafts 28 and 30 provided in section 2 as shown in FIG. 5. Gears 24 and 26 also mesh with and drive two other gears 32 and 34 which as shown in FIG. 5 are mounted on shafts 36 and 38 at either side of shafts 28 and 30.

Figure 6:
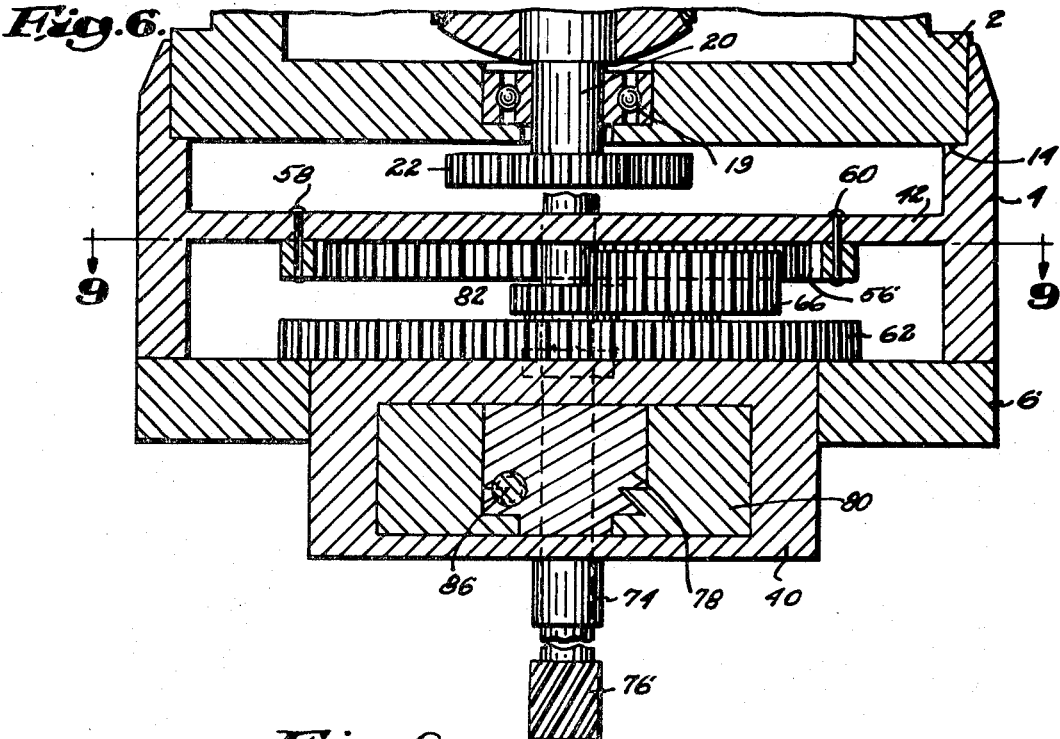
FIG. 6 is a cross section taken on the line 6–6 of FIG. 5.
Figure 8:
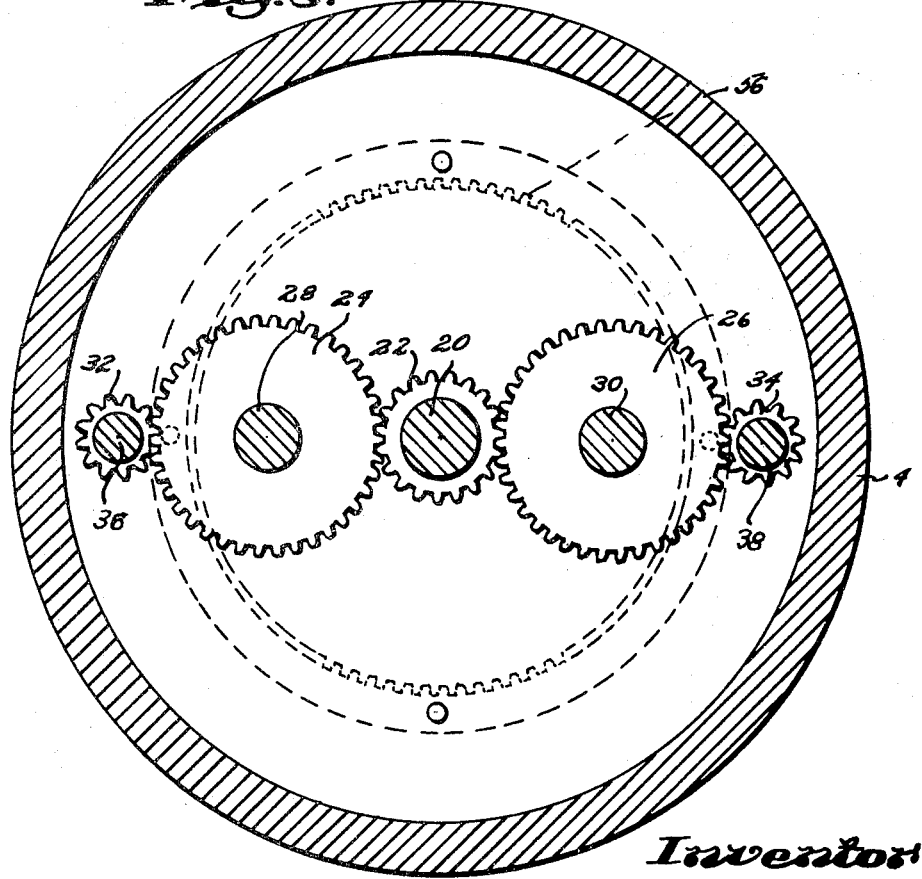
FIG. 8 is a cross section taken on the line 8–8 of FIG. 5.

Shafts 36 and 38 extend downwardly into the lower part of the housing section 4 as shown in FIG. 5 and drive a table member 40 which is rotatably supported in the bottom plate section 6 (FIG. 5), and which has a large gear 62 solidly secured to the upperside thereof as shown in FIG. 6. As will also be noted in FIG. 5, the shafts 36 and 38 are located through a centrally disposed transverse wall portion 42 formed in the section 4 and at the lower ends of these shafts 36 and 38 are fixed gears 44 and 46 which mesh with and drive the gear 62, thus causing table 40 to turn. The lower extremities 48 and 50 of the shafts 36 and 38 respectively may be supported in bearings 52 and 54 in the bottom section 56.

When the table 40 is turned in the manner noted, its rotative movement is utilized to actuate the cutting tool earlier noted. As best shown in FIG. 6 the underside of wall portion 42 has solidly secured thereto a ring gear member 56, for example, by means of bolts 58 and 60. Adjustably secured through the table 40 and movable with the table is a planetary gear shaft assembly 64 which consists of a bolt and cap. This gear shaft assembly 64 carries a planetary gear 66 which is arranged to mesh with fixed gear 56 when table 40 is rotated by gears 44 and 46.

The planetary gear shaft assembly 64 is adjustably secured in a curved guide slot 70 formed through the table 40 as illustrated in FIGS. 4 and 7. As noted above, the shaft assembly 64 includes a hollow bolt member 64 having a cap 72 and a bottom threaded member 71 which may be threaded into the hollow end of bolt 64 and tightened to hold the gear 66 in the curved guide slot 70 in a desired position of adjustment. The arc of curvature of guide slot 70 has a common center with gear 66 and is concentrically arranged within this gear so that in all positions of adjustment of gear 66 it will remain in mesh with gear 56.

Figure 12:
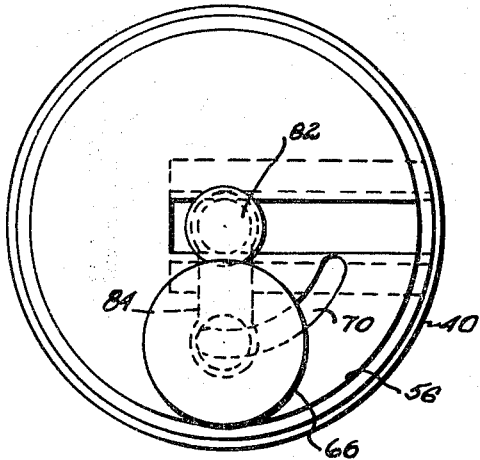
FIG. 12 is a detail plan view showing the output shaft and actuating means in a dead center position for boring a hole.
Figure 13:
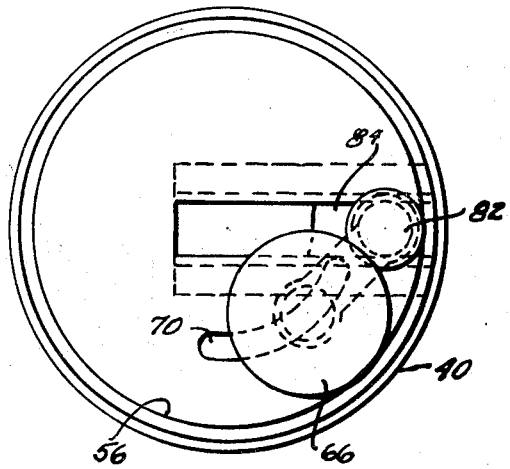
FIG. 13 is a view similar to FIG. 12 showing the output shaft in an extended position relative to dead center to provide for boring a hole of increased diameter.
Figure 14:
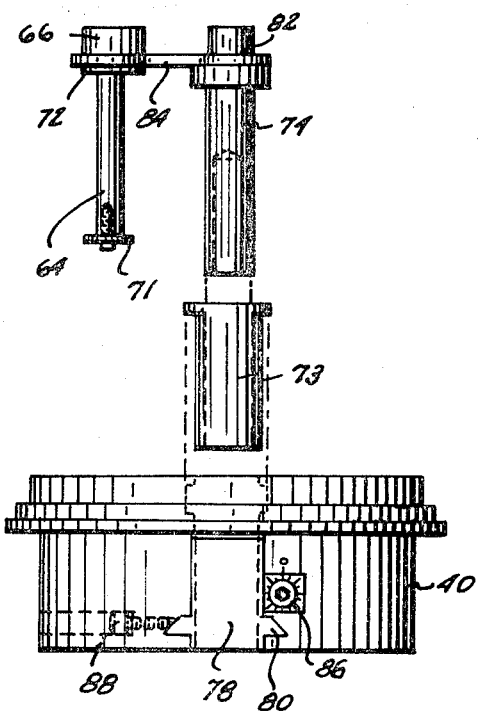
FIG. 14 is a detail view of the output shaft and connecting collar means removed from the machine tool.
Figure 15:
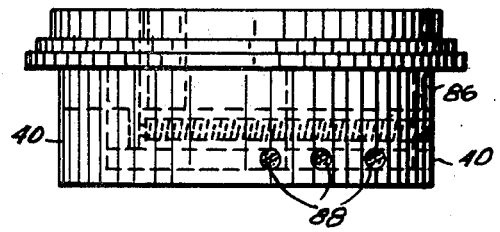
FIG. 15 is a detail elevational view of the rotary table further illustrating screw means for adjusting the slide in the table.

An important feature of the invention is the combination with the table 40 and its planetary gear means of a novel output drive shaft mounting and supporting slide mechanism which is also located in the table 40 as is better shown in FIG. 7, 9, 12 and 13. As indicated in these FIGS., the output drive shaft is denoted by the numeral 74 and may, for example, consist of a hollow cylindrical sleeve in which may be detachably secured a cutting tool 76. This output drive shaft 74 is retained in a bushing 73 and is further rotatably received through a slide member 78, which is slidably disposed in a dovetailed guide block 80, in turn mounted in a suitable opening 81 in the bottom of the table 40 as shown in FIGS. 12 to 14, inclusive.

The shaft 74 has fixed in its upper end a gear 82, and gears 82 and 66 are indicated diagrammatically in FIGS. 12 and 13. As shown in these FIGS., the two gears are held in fixed spaced relation to one another by means of a collar or link 84.

Located through the guide block is an adjustment screw 86 which is in threaded engagement with the slide member 78 so that by turning the screw the slide and output shaft can be moved towards or away from the center of the gear member 56. set screws 88 are provided for securing the slide member at any desired position in the dovetailed guide 80.

In carrying out a typical boring operation utilizing the method and apparatus of the invention, I may, for example, employ a gear drive which is chosen to provide for turning the table 40 at approximately 75 r.p.m. and I may utilize a cutting tool consisting of dead-center end miller which may be rotated about its own axis at a speed of, for example, 348 r.p.m. At these speeds the equipment described can be used to bore a hole of from approximately .040 inches in diameter up to a hole having a diameter of 3.5 inches. For small holes a one thirty-second inch end mill is used. For large holes an end mill of one-half inch diameter and larger may be employed. The boring tool is designed to be positioned in a dead center position as shown in FIG. 12 and to move out to the end of the travel as shown in FIG. 13 and the movement may be in increments of .001 inches. By means of the efficiency thus realized, larger amounts of material may be removed, as compared to conventional boring equipment varying with the class of material worked. It will also be seen that the slide mechanism provides a rugged and yet simply adjusted means for positioning and moving a cutting tool along a circular path of travel.

It will also be understood that the machine tool attachment described may be used for other purposes than boring. For example, I may desire to mount on the output shaft a grinding wheel to carry out grinding operations, and the gearing may be varied to provide higher rotative speeds for grinding where required. Similarly other machine tools may be utilized on the output shaft for various machining operations.

While I have shown a preferred embodiment of the invention, other changes and modifications may be resorted to as defined by the appended claims.

I claim:

1. A machine tool for forming a hole in a workpiece comprising a housing, a power-driven shaft mounted in one side of the housing, a tool-supporting table rotatably mounted in the housing at an opposite wide thereof, gear mechanism in the housing for connecting the power-driven shaft in driving relationship with the table to turn same about its central axis; said table being formed with a transverse centrally disposed slideway and a guide slot occurring in spaced relation to the slideway, a slide element transversely adjustable in the table slideway; a cutting tool shaft mounted for rotation in the slide element, and movable with the slide toward and away from the central axis of the table, a stationary ring gear secured in the housing above the table; a planetary gear shaft adjustably located through said guide slot in the table and carrying a planetary gear arranged to continuously mesh with inner gear teeth of the ring gear, an output gear fixed to the cutting tool shaft in a position to mesh with the planetary gear at points below the ring gear and rotate the cutting tool about its axis when the table is turned, and the planetary gear revolves inside the stationary ring gear.

2. A structure according to claim 1 in which the slide and slideway are dovetailed and provided with adjustment screw means for advancing and retracting the slide in the dovetailed slideway.

3. A structure as defined in claim 1 in which the said guide slot is formed along an arc which is concentric with the center of the table.

4. A machine tool as defined in claim 2 in which the planetary gear and output gear are connected by a collar element, said collar element being arranged to maintain the output gear and planetary gear in constant spaced relationship to one another with the planetary gear held in mesh with the stationary ring gear when the slide is advanced to increase the diameter of the hole being formed.

5. A structure according to claim 1 in which the slide includes an adjustment screw which can be turned to advance and return the slide in said slideway and setscrew means for holding the slide in a fixed position in the slideway.

6. A structure according to claim 1 in which the planetary gear shaft includes a threaded barrel portion and adjustment screw and cap means adjustable against the lower surface of the table to hold the shaft in any desired position of adjustment in the said guide slot.

7. A structure according to claim 1 in which the housing is provided with a transverse wall portion which defines upper and lower gear enclosures, said table having fixed in the upper side thereof a gear member occurring in the lower gear enclosure space, and a gear train in the upper gear enclosure space operatively connected with said fixed gear on the said table.

8. A structure according to claim 1 in which the gear mechanism in the housing for connecting the power-driven shaft in driving relationship with the table includes a gear fixed to the top of the said table, gear shaft elements occurring in spaced relation to the power-driven shaft at either side thereof, and supporting at upper and lower ends of said shafts gear trains which mesh with and drive the said gear fixed to the top of the table.